No. 740,116. PATENTED SEPT. 29, 1903.
M. C. FLYNN.
HORSESHOE.
APPLICATION FILED NOV. 25, 1902.
NO MODEL.
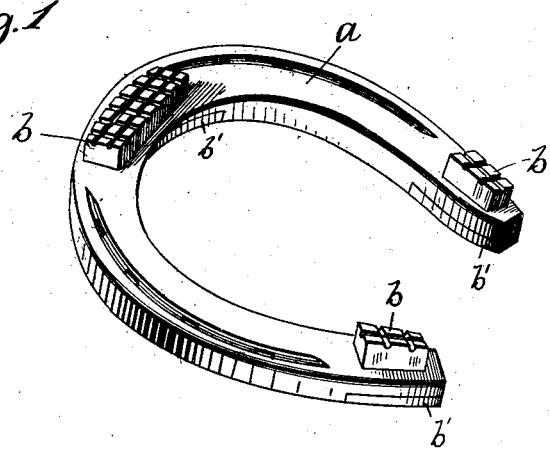
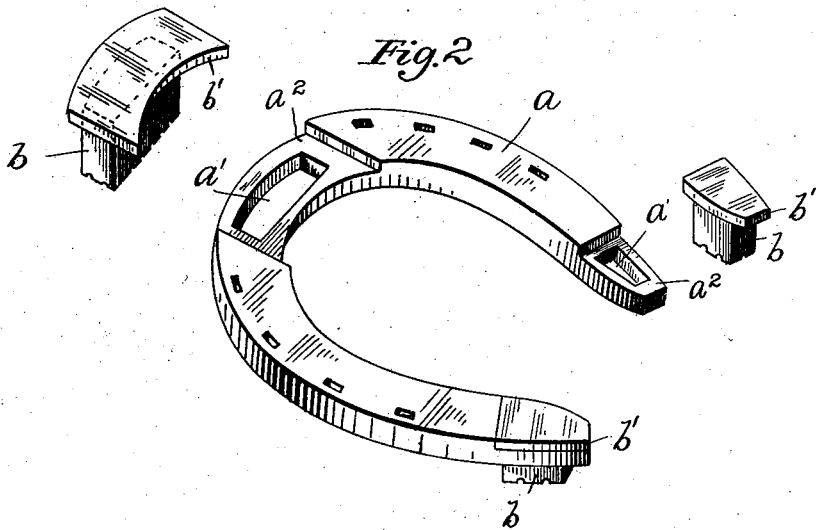
Witnesses
C. F. Kilgore
D. Kreimendahl
Inventor
Margaret C. Flynn
By Simonds & Hart
Attorneys No. 740,116. Patented September 29, 1903.

UNITED STATES PATENT OFFICE.

MARGARET C. FLYNN, OF HARTFORD, CONNECTICUT.

HORSESHOE.

SPECIFICATION forming part of Letters Patent No. 740,116, dated September 29, 1903.

Application filed November 25, 1902. Serial No. 132,821. (No model.)

*To all whom it may concern:*

Be it known that I, MARGARET C. FLYNN, a citizen of the United States of America, residing at Hartford, in the county of Hartford and State of Connecticut, have invented certain new and useful Improvements in Horseshoes with Rubber Attachments, of which the following is a specification.

The object of the improvement is the production of a horseshoe having attachable and detachable friction-holds of rubber and possessing certain features of novelty and advantage.

In the accompanying drawings, Figure 1 is a perspective view showing the lower face of a horseshoe embodying said improvement. Fig. 2 is a perspective view showing the upper face of the same horseshoe with two of the rubber attachments shown detached.

In the accompanying drawings, the letter $a$ denotes a horseshoe pierced by mortises $a'$. The letter $b$ denotes what may be termed "friction-holds" of rubber or some suitable compound of rubber and of such degree of hardness as may be desired. These friction-holds are provided at their bases with retaining-flanges $b'$, which are preferably of rubber and integral with the friction-holds themselves. On its upper face the horseshoe also has mortises $a^2$ for the retaining-flanges $b'$. The lower faces of the friction-holds are by preference corrugated or otherwise suitably roughened. These friction-holds are attachable to and detachable from the horseshoe. They are held in place when the shoe is in use by the attachment of the shoe to the horse's hoof, which may be done in the ordinary way or any other way.

I claim as my improvement—

In combination with a horseshoe having its central portion and ends formed with cutaway portions forming seats, the end seats being provided with approximately triangular mortises, the central seat having an approximately rectangular mortise the front edge of which is outwardly curved, calks projecting through said mortises, and flanges carried by said calks engaging said seats.

In testimony whereof I affix my signature in presence of two witnesses.

MARGARET C. FLYNN.

Witnesses:
D. I. KREIMENDAHL,
H. E. HART.